United States Patent
Muramatsu et al.

(10) Patent No.: US 12,208,835 B2
(45) Date of Patent: *Jan. 28, 2025

(54) VEHICLE CONTROL DEVICE

(71) Applicant: TOYOTA JIDOSHA KABUSHIKI KAISHA, Toyota (JP)

(72) Inventors: Naoyuki Muramatsu, Ichikawa (JP); Yushi Shibaike, Susono (JP); Naoki Nagakura, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/380,686

(22) Filed: Oct. 17, 2023

(65) Prior Publication Data

US 2024/0043065 A1 Feb. 8, 2024

Related U.S. Application Data

(63) Continuation of application No. 17/400,535, filed on Aug. 12, 2021, now Pat. No. 11,827,270.

(30) Foreign Application Priority Data

Aug. 18, 2020 (JP) .................................. 2020-138233

(51) Int. Cl.
*B62D 15/02* (2006.01)
(52) U.S. Cl.
CPC .................................. *B62D 15/025* (2013.01)
(58) Field of Classification Search
None
See application file for complete search history.

(56) References Cited

U.S. PATENT DOCUMENTS

| | | | |
|---|---|---|---|
| 11,119,491 B2 | 9/2021 | Jammoussi et al. | |
| 11,440,546 B2 | 9/2022 | Oka et al. | |
| 2016/0221604 A1 | 8/2016 | Yamaoka | |
| 2019/0315345 A1* | 10/2019 | Newman | B60W 50/14 |
| 2020/0398833 A1* | 12/2020 | Hudecek | B60W 30/0956 |
| 2020/0398894 A1 | 12/2020 | Hudecek et al. | |
| 2022/0055687 A1 | 2/2022 | Muramatsu et al. | |
| 2022/0324444 A1 | 10/2022 | Germain et al. | |

FOREIGN PATENT DOCUMENTS

| | | |
|---|---|---|
| JP | 2016-139369 A | 8/2016 |
| JP | 2022-034445 A | 3/2022 |

* cited by examiner

*Primary Examiner* — Jaime Figueroa
*Assistant Examiner* — Jerrod Irvin Davis
(74) *Attorney, Agent, or Firm* — Dinsmore & Shohl LLP

(57) ABSTRACT

A vehicle control device includes an offset unit configured to execute offset processing for offsetting the target lateral position such that the target lateral position is separated from the first lane, when a relationship between the first vehicle and the vehicle satisfies an offset condition. The offset unit is configured not to execute the offset processing even if the relationship between the first vehicle and the vehicle satisfies the predetermined offset condition, when a vehicle-to-vehicle distance between the second vehicle and the vehicle is equal to or less than a predetermined distance or when a value obtained by dividing the vehicle-to-vehicle distance between the second vehicle and the vehicle by a relative speed between the second vehicle and the vehicle is equal to or less than a predetermined time.

9 Claims, 5 Drawing Sheets

*Fig.4*

| | OPERATION STATE BEFORE TRANSITION | |
|---|---|---|
| | NON-OPERATION | OPERATION |
| OFFSET PROCESSING START CONDITION IS SATISFIED PREDETERMINED NUMBER OF TIMES IN SUCCESSION AND IS NOT IN START PROHIBITION AREA | OPERATION | — |
| OFFSET PROCESSING START CONDITION IS SATISFIED PREDETERMINED NUMBER OF TIMES IN SUCCESSION AND IS IN START PROHIBITION AREA | NON-OPERATION | — |
| OFFSET PROCESSING START CONDITION IS NOT SATISFIED PREDETERMINED NUMBER OF TIMES IN SUCCESSION | NON-OPERATION | — |
| OFFSET PROCESSING CONTINUATION CONDITION IS SATISFIED PREDETERMINED NUMBER OF TIMES IN SUCCESSION AND IS NOT IN CONTINUATION PROHIBITION AREA | — | OPERATION |
| OFFSET PROCESSING CONTINUATION CONDITION IS SATISFIED PREDETERMINED NUMBER OF TIMES IN SUCCESSION AND IS IN CONTINUATION PROHIBITION AREA | — | NON-OPERATION |
| OFFSET PROCESSING CONTINUATION CONDITION IS NOT SATISFIED PREDETERMINED NUMBER OF TIMES IN SUCCESSION | — | NON-OPERATION |

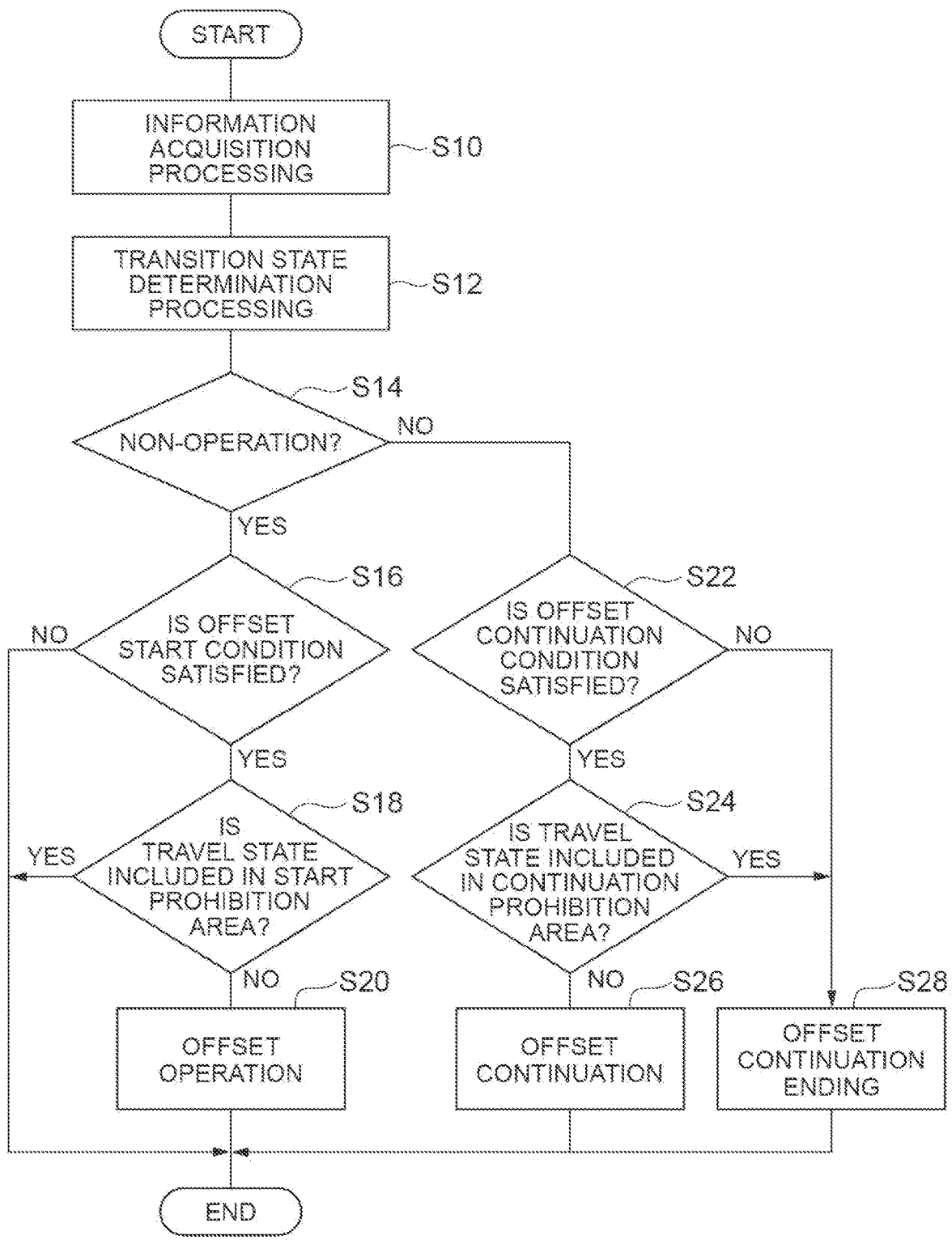

VEHICLE CONTROL DEVICE

CROSS-REFERENCE TO RELATED APPLICATION

This application is a continuation application of U.S. patent application Ser. No. 17/400,535 filed Aug. 12, 2021, which claims the benefit of priority from Japanese Patent Application No. 2020-138233, filed Aug. 18, 2020, the entire contents of which are incorporated herein by reference.

TECHNICAL FIELD

The present disclosure relates to a vehicle control device.

BACKGROUND

Japanese Unexamined Patent Publication No. 2016-139369 discloses a device for causing a vehicle to travel along a lane. This device sets a target lateral position (position in the vehicle width direction) in the lane and causes the vehicle to travel along the target lateral position. When a preceding vehicle is traveling in an adjacent lane, this device offsets the target lateral position to be laterally separated from the preceding vehicle in the vehicle width direction, and then, causes the vehicle to travel separated from the preceding vehicle.

SUMMARY

Incidentally, when a vehicle travels on a central lane of a road having equal to or more than three lanes, the situation may be such that vehicles can be present in the lanes on both sides. In such a scene, if the target lateral position is offset such that the vehicle is separated from the vehicle traveling on a first lane among the lanes on both sides, a vehicle behavior is to be closer to the vehicle traveling on a second lane among the lanes on both sides. Such vehicle behavior may give anxiety to occupants (including a driver).

The present disclosure provides a vehicle control device that can suppress a problem of giving anxiety to the occupants.

An aspect of the present disclosure is to provide a vehicle control device that controls a vehicle such that a lateral position of the vehicle becomes a target lateral position set in a lane. The device includes a first vehicle detection unit, a second vehicle detection unit, an offset unit, and a controller. The first vehicle detection unit is configured to detect a first vehicle traveling in a first lane among lanes adjacent to both sides of the lane in which the vehicle travels. The second vehicle detection unit is configured to detect a second vehicle traveling in a second lane among the lanes adjacent to both sides of the lane in which the vehicle travels. The offset unit is configured to offset the target lateral position in the lane in which the vehicle travels such that the target lateral position is separated from the first lane, when a relationship between the first vehicle and the vehicle satisfies a predetermined offset condition. The controller is configured to control the travel of the vehicle according to the target lateral position. The offset unit is configured not to execute the offset processing even if the relationship between the first vehicle and the vehicle satisfies the predetermined offset condition, when a vehicle-to-vehicle distance between the second vehicle and the vehicle is equal to or less than a predetermined distance or when a value obtained by dividing the vehicle-to-vehicle distance between the second vehicle and the vehicle by a relative speed between the second vehicle and the vehicle is equal to or less than a predetermined time.

According to the device, the first vehicle and the second vehicle traveling in the first lane and the second lane adjacent to both sides of the lane in which the vehicle travels are detected by the first vehicle detection unit and the second vehicle detection unit. When the relationship between the first vehicle and the vehicle satisfies the predetermined offset condition, the offset processing is executed by the offset unit such that the target lateral position is separated from the first lane. Here, when the vehicle-to-vehicle distance between the second vehicle and the vehicle is equal to or less than the predetermined distance, or when the value obtained by dividing the vehicle-to-vehicle distance between the second vehicle and the vehicle by the relative speed between the second vehicle and the vehicle is equal to or less than the predetermined time, even if the relationship between the first vehicle and the vehicle satisfies the predetermined offset condition, the offset processing is not executed. Therefore, the offset processing that brings the vehicle behavior of approaching the second vehicle where the vehicle-to-vehicle distance to the vehicle is equal to or less than the predetermined distance is avoided, and the offset processing that brings the vehicle behavior of approaching the second vehicle where the value obtained by dividing the vehicle-to-vehicle distance with the vehicle by the relative speed with the vehicle is equal to or less than the predetermined time is avoided. Accordingly, the vehicle control device can suppress the problem of giving anxiety to the occupants.

In an embodiment, the offset unit may be configured to set a start prohibition area where the offset processing is not performed even when the relationship between the first vehicle and the vehicle satisfies the predetermined offset condition and a continuation prohibition area that is narrower than the start prohibition area and where the offset processing is not continued even if the relationship between the first vehicle and the vehicle satisfies the predetermined offset condition after the offset processing is started, on a coordinate plane having the vehicle-to-vehicle distance between the second vehicle and the vehicle as a first axis and the relative speed between the second vehicle and the vehicle as a second axis, and determine the start or continuation of the offset processing based on the vehicle-to-vehicle distance between the second vehicle and the vehicle, the relative speed between the second vehicle and the vehicle, the start prohibition area, the continuation prohibition area, and an execution state of the offset processing. In this case, the offset prohibition area is set using two parameters of the relative speed and the vehicle-to-vehicle distance, and further, the offset prohibition area is set to be divided into a start prohibition area and a continuation prohibition area. Therefore, compared to simply providing an offset prohibition area, since the vehicle control device can avoid the repetition of the offset execution and stopping the execution in a scene of a vehicle state where the vehicle is in the vicinity of the boundary of the offset prohibition area, it is possible to stabilize the vehicle behavior.

According to various aspects and an embodiment of the present disclosure, it is possible to suppress the problem of giving anxiety to the occupants.

BRIEF DESCRIPTION OF THE DRAWINGS

FIG. 4 is a table for explaining an operation state of offset processing.

FIG. 5 is a flowchart illustrating an operation by the vehicle control device.

DETAILED DESCRIPTION

Figure 1:
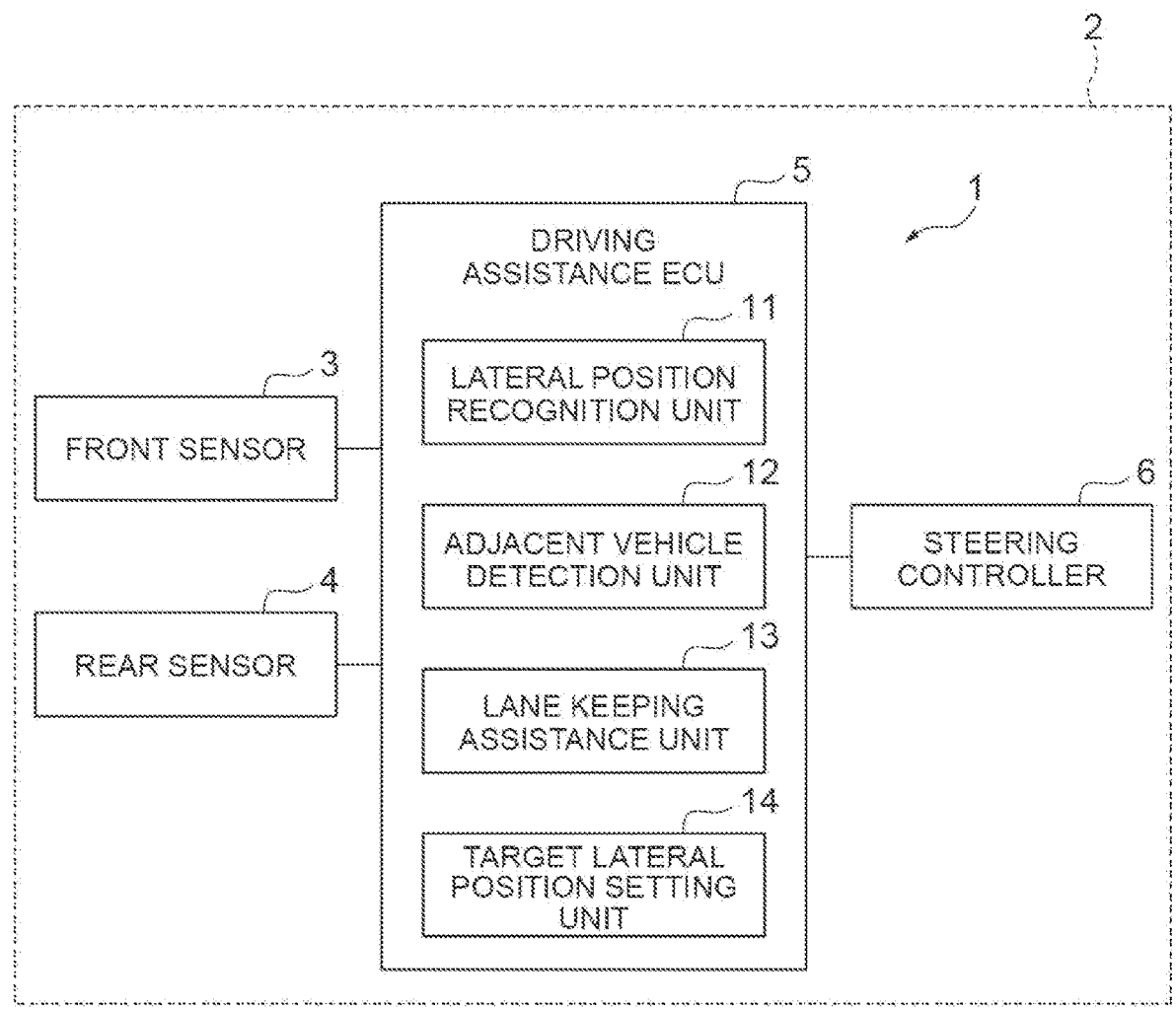
FIG. 1 is a functional block diagram of an example of a vehicle including a vehicle control device in an embodiment.

Hereinafter, an exemplary embodiment will be described with reference to the drawings. In the following description, the same reference numerals will be given to the same or equivalent elements, and the descriptions thereof will not be repeated.

Configuration of a Vehicle and a Vehicle Control Device

FIG. 1 is a functional block diagram of an example of a vehicle including a vehicle control device in an embodiment. As illustrated in FIG. 1, the vehicle control device 1 is a device mounted on a vehicle 2 such as a passenger car and causes the vehicle 2 to travel along a lane. The vehicle 2 includes a front sensor 3, a rear sensor 4, a driving assistance ECU 5, and a steering controller 6.

The front sensor 3 is a detector that detects a situation in front of the vehicle 2. The front sensor 3 detects a position and travel information of an object in front of the road on which the vehicle 2 travels. The travel information includes a speed, acceleration, and the like of the object. The rear sensor 4 is a detector that detects a situation behind the vehicle 2. The rear sensor 4 detects a position and travel information of the object behind the road on which the vehicle 2 travels. The travel information includes a speed, acceleration, and the like of the object. The front sensor 3 and the rear sensor 4 include at least one of a camera and a radar sensor.

The camera is an imaging device that images an external situation of the vehicle 2. The camera acquires imaging information relating to the external situation of the vehicle 2. For example, the cameras are provided on a back surface of a windshield and a rear glass of the vehicle 2, respectively. The camera may be a monocular camera or a stereo camera. The stereo camera has two imaging units arranged to reproduce binocular parallax. The imaging information by the stereo camera also includes information in the depth direction.

The radar sensor is a detector that detects an object around the vehicle 2 using radio waves (for example, millimeter waves) or light. The radar sensors are provided, for example, at a front end and a rear end of the vehicle 2. The radar sensor includes, for example, a millimeter-wave radar or a LIDAR (Laser Imaging Detection and Ranging). The radar sensor transmits radio waves or light to the around the vehicle 2, and detects the object by receiving the radio waves or light reflected from the object.

The steering controller 6 is an electronic control unit that controls an electric power steering (EPS) system of the vehicle 2. The steering controller 6 controls a steering torque of the vehicle 2 by driving a steering actuator that controls the steering torque of the vehicle 2 in the electric power steering system. The steering controller 6 controls the steering torque in response to a control signal from the driving assistance ECU 5.

The driving assistance ECU 5 performs the control relating to steering. The driving assistance ECU 5 is an electronic control unit including a central processing unit (CPU), a read only memory (ROM), a random access memory (RANI), and a controller area network (CAN) communication circuit. The driving assistance ECU 5 is, for example, connected to a network that communicates using a CAN communication circuit, and is communicably connected to the configuration elements of the vehicle 2 described above. The driving assistance ECU 5 realizes the control relating to steering by operating the CAN communication circuit to input and output data based on, for example, a signal output by the CPU and storing the data in the RAM, and by executing the program stored in the ROM. The driving assistance ECU 5 may load the program in the RAM and execute the program loaded in the RAM to realize the control relating to steering. The driving assistance ECU 5 may be configured with a plurality of electronic control units.

Next, a functional configuration of the driving assistance ECU 5 will be described. The driving assistance ECU 5 sets a target travel position in the vehicle width direction in the lane where the vehicle 2 is positioned (hereinafter, referred to as a travel lane) and operates the steering controller 6 such that the travel position of the vehicle 2 becomes the target travel position. The driving assistance ECU 5 may be applied to a travel scene in which lanes are present on both sides of the travel lane. That is, the road may include equal to or more than three lanes.

Figure 2:
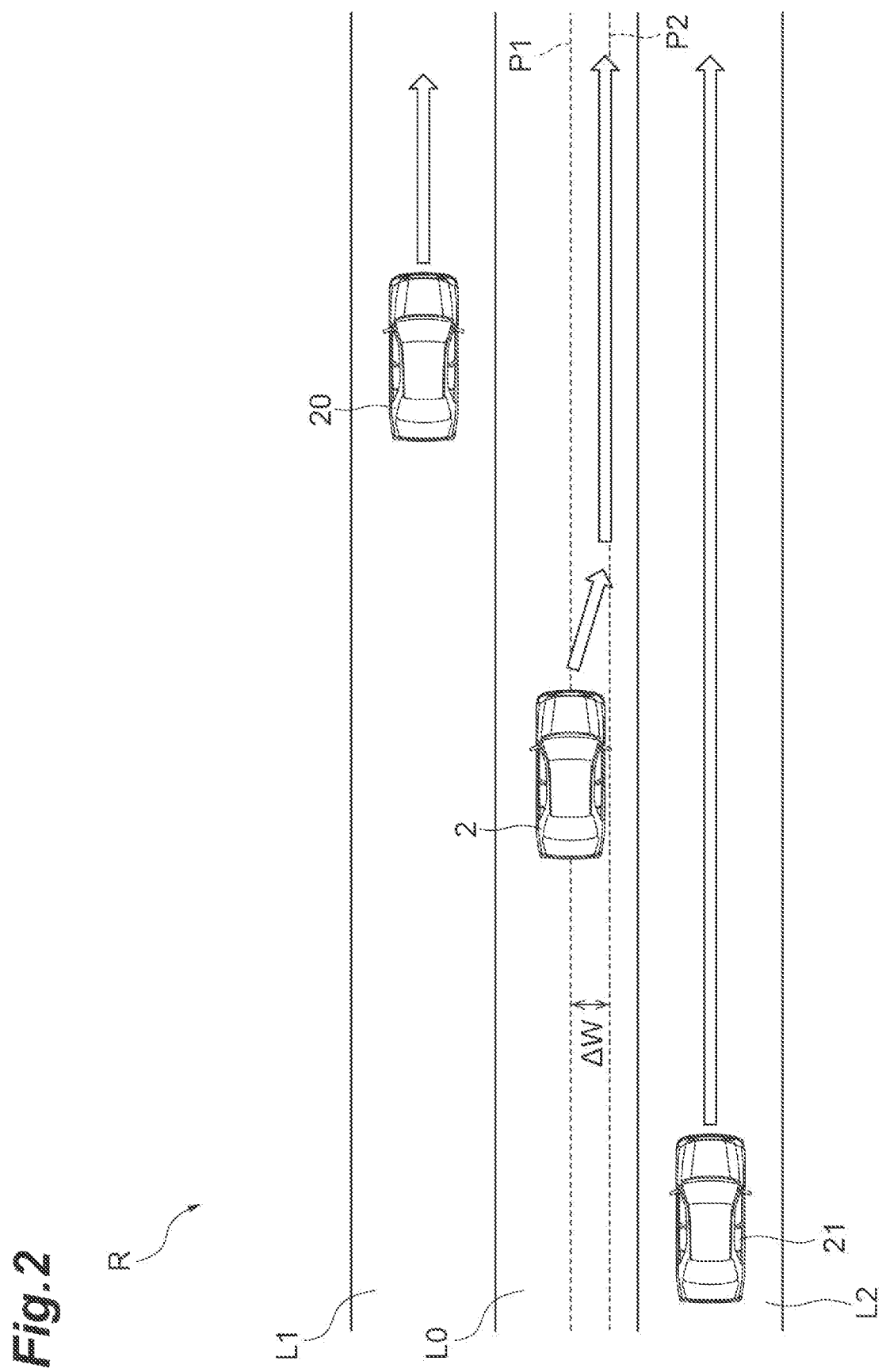
FIG. 2 is a diagram illustrating a travel scene of a vehicle traveling on a road including three lanes.

FIG. 2 is a diagram illustrating the travel scene of a vehicle traveling on a road including three lanes. As illustrated in FIG. 2, a road R has three lanes, and the vehicle 2 travels on the central lane (travel lane L0). A left lane L1 is adjacent to the left side of the travel lane L0, and a left vehicle 20 travels therein. A right lane L2 is adjacent to the right side of the travel lane L0, and a right vehicle 21 travels therein.

The driving assistance ECU 5 includes a lateral position recognition unit 11, an adjacent vehicle detection unit 12 (a first vehicle detection unit, a second vehicle detection unit), a lane keeping assistance unit (controller) 13, and a target lateral position setting unit (an offset unit) 14.

The lateral position recognition unit 11 recognizes a lateral position of the vehicle 2. The lateral position recognition unit 11 recognizes a boundary line of the travel lane L0 by image analysis based on, for example, the front and rear images of the vehicle 2 acquired by the front sensor 3 and the rear sensor 4. The lateral position recognition unit 11 recognizes the lateral position of the vehicle 2 in the travel lane L0 based on the position of the recognized boundary line in the image.

The adjacent vehicle detection unit 12 detects vehicles (a left vehicle 20 and a right vehicle 21) traveling in the adjacent lanes (the left lane L1 and the right lane L2) on both sides of the travel lane L0. The adjacent vehicle detection unit 12 detects the left vehicle 20 and the right vehicle 21 based on the detection information detected by a laser radar and the like acquired by, for example, the front sensor 3 and the rear sensor 4. The adjacent vehicle detection unit 12 may detect the left vehicle 20 and the right vehicle 21 based on the images acquired by the front sensor 3 and the rear sensor 4.

The adjacent vehicle detection unit 12 detects travel states of the left vehicle 20 and the right vehicle 21 and a vehicle-to-vehicle distance. The adjacent vehicle detection unit 12 recognizes the vehicle-to-vehicle distance and the relative speed between the left vehicle 20 and vehicle 2, and the vehicle-to-vehicle distance and the relative speed between the right vehicle 21 and vehicle 2, based on, for example, the detection information detected by the laser radar and the like acquired by the front sensor 3 and the rear sensor 4. The vehicle-to-vehicle distance is a vehicle-to-vehicle distance in the travel direction of the vehicle 2. The relative speed is a speed that is a difference of the speed of the vehicle 2 in the travel direction of the vehicle 2. The adjacent vehicle detection unit 12 detects a lane width direction distance between the left vehicle 20 and the vehicle 2 and a lane width direction distance between the right vehicle 21 and the vehicle 2 based on the detection information detected by the laser radar, and the like acquired by the front sensor 3 and the rear sensor 4. The lane width direction distance is a distance in the width direction of the lane. The adjacent vehicle detection unit 12 may additionally detect a lane width direction distance between the left vehicle 20 and the left lane when viewed from the vehicle 2 and a lane width direction distance between the right vehicle 21 and the right lane when viewed from the vehicle 2.

The lane keeping assistance unit 13 performs a lane keeping assistance for the vehicle 2. The lane keeping assistance unit 13 starts the lane keeping assistance based on, for example, a switch operation by the occupants. The lane keeping assistance unit 13 controls the travel of the vehicle 2 by giving a steering torque to the vehicle 2 such that the lateral position of the vehicle 2 recognized by the lateral position recognition unit 11 becomes the target lateral position set by the target lateral position setting unit 14. The lane keeping assistance unit 13 gives the steering torque to the vehicle 2 by transmitting a control signal to the steering controller 6.

The target lateral position setting unit 14 sets the target lateral position used by the lane keeping assistance unit 13 when controlling the lateral position of the vehicle 2. First, the target lateral position setting unit 14 sets an initial target lateral position set in advance to the travel lane L0 as the target lateral position used by the lane keeping assistance unit 13. The initial target lateral position is a central position P1 in the travel lane L0 in the lane width direction. The initial target lateral position is not limited to the central position, and may be a position closer to any of the boundary lines.

Furthermore, the target lateral position setting unit 14 performs the offset processing for offsetting the target lateral position used by the lane keeping assistance unit 13 from the central position P1 in the travel lane L0 to be separated from the left lane L1 or the right lane L2. Such processing is performed, for example, when the vehicle 2 overtakes the left vehicle 20. Hereinafter, the offset processing will be described with an example of a case where the left vehicle 20 is present, but not limited to this, and the same processing can also be performed on the presence of the right vehicle 21. In addition, hereinafter, the vehicle that causes the offset processing is also referred to as a first vehicle. As the offset processing with respect to the left vehicle 20 (an example of the first vehicle), the target lateral position setting unit 14 changes the target lateral position (central position P1) used by the lane keeping assistance unit 13 to a position (position P2) which is shifted in the lane width direction as much as a predetermined distance. A value set in advance may be used as an offset amount ΔW offsetting the target lateral position, that is, the distance in the lane width direction between the central position P1 and the changed target lateral position.

The offset processing for offsetting the target lateral position to be separated from the left vehicle 20 is determined to be executable when the relationship between the left vehicle 20 and the vehicle 2 satisfies a predetermined offset condition (offset start condition). The offset condition is a condition for determining whether or not to perform the offset processing, for example, a case where a travel direction distance between the left vehicle 20 and the vehicle 2 detected by the adjacent vehicle detection unit 12 is equal to or less than a travel direction threshold value, and a case where a lane width direction distance between the left vehicle 20 and the lane boundary line is equal to or less than a lane width direction threshold value. A value set in advance can be used as the travel direction threshold value and the lane width direction threshold value. The target lateral position setting unit 14 may execute the determination of the offset condition a plurality of times and may determine that the offset condition is satisfied when the offset condition is satisfied a predetermined number of times in succession.

The target lateral position setting unit 14 ends the offset processing when an offset continuation condition is no longer satisfied. The offset continuation condition may be a condition in which the offset start condition is no longer satisfied, or in which the travel direction threshold value or the lane width direction threshold value may be changed. In this case, the target lateral position setting unit 14 returns the target lateral position (position P2) used by the lane keeping assistance unit 13 to the initial target lateral position (central position P1).

In addition, when the vehicle-to-vehicle distance between the right vehicle 21 and the vehicle 2 is equal to or less than a predetermined distance, or when a time to collision (TTC) between the right vehicle 21 and the vehicle 2 is equal to or less than a predetermined time, even if the relationship between the left vehicle 20 and the vehicle 2 satisfies the predetermined offset condition, the target lateral position setting unit 14 does not execute the offset processing. That is, the target lateral position setting unit 14 determines the final execution of the offset processing based on the relationship with the right vehicle 21 (an example of the second vehicle) that is approached due to the offset processing with respect to the left vehicle 20. The predetermined distance is a threshold value of a predetermined distance for determining the vehicle-to-vehicle distance between the right vehicle 21 and the vehicle 2. The TTC is a value obtained by dividing the vehicle-to-vehicle distance between the right vehicle 21 and the vehicle 2 by the relative speed between the right vehicle 21 and the vehicle 2. The predetermined time is a threshold value of a predetermined time for determining the TTC between the right vehicle 21 and the vehicle 2. The vehicle 2 approaches the right vehicle 21 by the offset processing with respect to the left vehicle 20. At this time, when the vehicle-to-vehicle distance to the right vehicle 21 is close or the TTC is short, the occupants may feel oppressive or may be anxious for the right vehicle 21. The target lateral position setting unit 14 solves the above-described problems by setting an offset prohibition condition and not executing offset processing even if the relationship between the left vehicle 20 and the vehicle 2 satisfies the predetermined offset condition.

The target lateral position setting unit 14 may classify the offset prohibition condition into an offset start prohibition condition and an offset continuation prohibition condition, and may perform the determination by selecting any one of the offset start prohibition condition and the offset continuation prohibition condition according to the current offset operation situation of the vehicle 2. The offset start prohibition area is a condition in which the start of offset processing is prohibited, and the offset continuation prohibition area is a condition in which the continuation of offset processing is prohibited.

Figure 3:
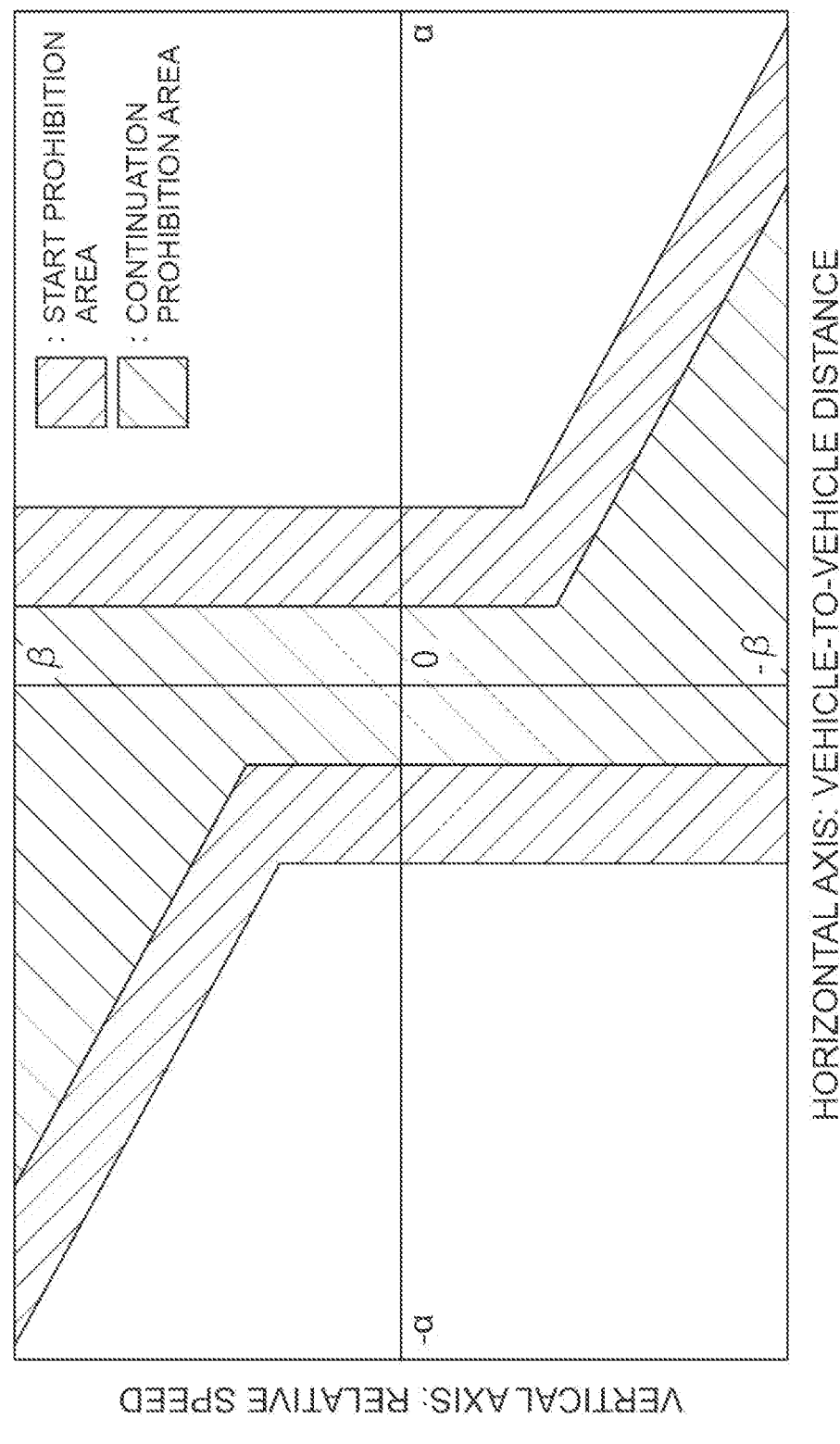
FIG. 3 is a graph illustrating a start prohibition area and a continuation prohibition area.

FIG. 3 is a graph illustrating a start prohibition area and a continuation prohibition area. In the graph illustrated in FIG. 3, the horizontal axis represents the vehicle-to-vehicle distance and the vertical axis represents the relative speed. As illustrated in FIG. 3, the start prohibition area and the continuation prohibition area are set in a coordinate plane having the vehicle-to-vehicle distance between the right vehicle 21 and the vehicle 2 as a first axis and the relative speed between the right vehicle 21 and the vehicle 2 as a second axis. For the start prohibition area, when the vehicle-to-vehicle distance is long in a certain extent, a lower limit value of the allowable relative speed is set larger as the vehicle-to-vehicle distance increases. Since the TTC becomes longer as the vehicle-to-vehicle distance increases, the allowable lower limit value of the relative speed also becomes larger. On the other hand, if the vehicle-to-vehicle distance is short in a certain extent, since the vehicle can be considered to be running side by side, the offset processing is prohibited regardless of the relative speed. The continuation prohibition area is a smaller area than the start prohibition area, and is set within the start prohibition area. When the travel state of the right vehicle 21 and the vehicle 2 is included in the start prohibition area, the target lateral position setting unit 14 does not start the offset processing. In addition, when the travel state of the right vehicle 21 and the vehicle 2 is included in the continuation prohibition area after the offset processing starts, the target lateral position setting unit 14 does not continue the offset processing.

FIG. 4 is a table for explaining the operation state of the offset processing. FIG. 4 summarizes the operation state of the offset processing by the target lateral position setting unit 14 described above. As illustrated in FIG. 4, when the operation state before the transition is non-operation (that is, offset processing is not executed), the three conditions from the top are determined. A first condition is a condition in which the offset processing start condition is satisfied a predetermined number of times in succession in the relationship with the left vehicle 20, and is not in the start prohibition area in the relationship with the right vehicle 21. In this case, the offset processing is started (transition from non-operation state to the operation state). A second condition is a condition in which the offset processing start condition is satisfied a predetermined number of times in succession in the relationship with the left vehicle 20, and is in the start prohibition area in the relationship with the right vehicle 21. In this case, the offset processing is not started (maintains the non-operation state). A third condition is a condition in which the offset processing start condition is not satisfied a predetermined number of times in succession in the relationship with the left vehicle 20. In this case, the offset processing is not started (maintains the non-operation state).

When the operation state before the transition is an operation (that is, during the execution of the offset processing), the three conditions from the bottom are determined. The first condition is a condition in which the offset processing continuation condition is satisfied a predetermined number of times in succession in the relationship with the left vehicle 20, and is not in the continuation prohibition area in the relationship with the right vehicle 21. In this case, the offset processing is continued (maintains the operation state). The second condition is a condition in which the offset processing continuation condition is satisfied a predetermined number of times in succession in the relationship with the left vehicle 20, and is in the continuation prohibition area in the relationship with the right vehicle 21. In this case, the offset processing is not continued (transition from the operation state to the non-operation state). The third condition is a condition in which the offset processing continuation condition is not satisfied a predetermined number of times in succession in the relationship with the left vehicle 20. In this case, the offset processing is not continued (transition from the operation state to the non-operation state).

Operation by Vehicle Control Device

FIG. 5 is a flowchart illustrating an operation by the vehicle control device. The flowchart illustrated in FIG. 5 is started, for example, when the occupants perform an operation for starting a lane keeping function.

As illustrated in FIG. 5, the vehicle control device 1 acquires the information on the vehicle 2 and the information around the vehicle 2 as information acquisition processing (step S10). Specifically, the lateral position recognition unit 11 recognizes the lateral position of the vehicle 2. In addition, the adjacent vehicle detection unit 12 acquires the distance and the relative speed of the left vehicle 20 and the distance and the relative speed of the right vehicle 21.

Subsequently, the target lateral position setting unit 14 determines the current offset operation situation of the vehicle 2 as transition state determination processing (step S12). The target lateral position setting unit 14 determines whether the offset of the vehicle 2 is in the non-operation or not as non-operation determination processing (step S14).

When it is determined that the offset of the vehicle 2 is in the non-operation (YES in step S14), the target lateral position setting unit 14 determines the travel state between the left vehicle 20 and the vehicle 2 based on the information acquired in step S10 and determines whether or not the offset start condition is satisfied, as offset start determination processing (step S16). For example, when the travel direction distance between the left vehicle 20 and the vehicle 2 is equal to or less than the travel direction threshold value, and the lane width direction distance between the left vehicle 20 and the lane boundary line is equal to or less than the lane width direction threshold value, the target lateral position setting unit 14 determines that the offset start condition is satisfied.

When it is determined that the offset start condition is satisfied (YES in step S16), the target lateral position setting unit 14 determines whether or not the travel state between the right vehicle 21 and the vehicle 2 is included in the start prohibition area illustrated in FIG. 3 as start prohibition determination (step S18).

When it is determined that the travel state is not included in the start prohibition area (NO in step S18), the target lateral position setting unit 14 changes the target lateral position (central position P1) used by the lane keeping assistance unit 13 to a position (position P2) which is shifted in the lane width direction as much as a predetermined distance, as the offset operation (step S20). The lane keeping assistance unit 13 controls the vehicle 2 so as to be positioned at the position P2.

On the other hand, when it is determined that the offset of the vehicle 2 is in the operation (NO in step S14), the target lateral position setting unit 14 determines the travel states of the left vehicle 20 and the vehicle 2 based on the information acquired in step S10, and determines whether or not the offset continuation condition is satisfied, as offset continuation determination processing (step S22). For example, when the travel direction distance between the left vehicle 20 and the vehicle 2 is equal to or less than the travel direction threshold value, and the lane width direction distance between the left vehicle 20 and the lane boundary line is equal to or less than the lane width direction threshold value, the target lateral position setting unit 14 determines that the offset continuation condition is satisfied.

When it is determined that the offset continuation condition is satisfied (YES in step S22), the target lateral position setting unit 14 determines whether or not the travel state of the right vehicle 21 and the vehicle 2 is included in the continuation prohibition area illustrated in FIG. 3, as continuation prohibition determination (step S24).

When it is determined that the travel state is not included in the continuation prohibition area (NO in step S24), the target lateral position setting unit 14 continues to keep the target lateral position (position P2) used by the lane keeping assistance unit 13, as the offset continuation (step S26). The lane keeping assistance unit 13 controls the vehicle 2 so as to be positioned at the position P2.

When it is not determined that the offset continuation condition is satisfied (NO in step S22) and when it is determined that the travel state is included in the continuation prohibition area (YES in step S24), the target lateral position setting unit 14 returns the target lateral position (position P2) used by the lane keeping assistance unit 13 to the central position P1, as an offset continuation ending (step S28).

When it is not determined that the offset start condition is satisfied (NO in step S16), when it is determined the travel state is included in the start prohibition area (YES in step S18), when the offset operation (step S20) is ended, when the offset continuation (step S26) is ended, and when the offset continuation ending (step S28) is ended, the flowchart illustrated in FIG. 5 ends. After the end, the flowchart is executed from the beginning until a predetermined end condition is satisfied. The predetermined end condition is, for example, when the occupants perform an operation to end the lane keeping function.

Summary of Embodiment

According to the vehicle control device 1, the left vehicle 20 (an example of the first vehicle) traveling in the left lane L1 (an example of the first lane) adjacent to both sides of the travel lane L0 and the right vehicle 21 (an example of the second vehicle) traveling in the right lane L2 (an example of the second lane) are detected by the adjacent vehicle detection unit 12. When the relationship between the left vehicle 20 and the vehicle 2 satisfies the predetermined offset condition, the offset processing is executed by the target lateral position setting unit 14 such that the vehicle 2 is separated from the left lane L1. Here, when the vehicle-to-vehicle distance between the right vehicle 21 and the vehicle 2 is equal to or less than the predetermined distance, or when the TTC between the right vehicle 21 and the vehicle 2 is equal to or less than the predetermined time, even if the relationship between the left vehicle 20 and the vehicle 2 satisfies the predetermined offset condition, the offset processing is not executed. Therefore, the offset processing that brings the vehicle behavior of approaching the right vehicle 21 where the vehicle-to-vehicle distance to the vehicle 2 is equal to or less than the predetermined distance is avoided, and the offset processing that brings the vehicle behavior of approaching the right vehicle 21 where the TTC with the vehicle 2 is equal to or less than the predetermined time is avoided. Accordingly, the vehicle control device 1 can suppress the problem of giving anxiety to the occupants.

According to the vehicle control device 1, an offset prohibition area is set using two parameters of the relative speed and the vehicle-to-vehicle distance, and further, the offset prohibition area is set to be divided into a start prohibition area and a continuation prohibition area. Therefore, compared to simply providing an offset prohibition area, since the vehicle control device 1 can avoid repetition of the offset execution and stopping the execution in a scene of a vehicle state where the vehicle is in the vicinity of the boundary of the offset prohibition area, it is possible to stabilize the vehicle behavior.

As described above, various exemplary embodiments have been described, but not limited to the above-described exemplary embodiments, various omissions, substitutions, and changes may be made.

For example, the target lateral position setting unit 14 may change the offset processing start prohibition condition and the offset processing continuation prohibition condition according to the vehicle type. For example, when the right vehicle 21 is a truck, the target lateral position setting unit 14 may determine the offset processing start prohibition using only the vehicle-to-vehicle distance.

What is claimed is:

1. A vehicle control device that controls a travel of a vehicle such that a lateral position of the vehicle becomes a target lateral position set in a lane, comprising:
 a first vehicle detection unit configured to detect a first vehicle traveling in a first lane among lanes adjacent to both sides of the lane in which the vehicle travels;
 a second vehicle detection unit configured to detect a second vehicle traveling in a second lane among the lanes adjacent to both sides of the lane in which the vehicle travels;
 an offset unit configured to execute offset processing for shifting the target lateral position in the lane in which the vehicle travels such that the target lateral position is separated from the first lane, when a relationship between the first vehicle and the vehicle satisfies a predetermined offset condition; and
 a controller configured to control the travel of the vehicle according to the target lateral position,
 wherein the offset unit is configured to set the target lateral position to a central position of the lane even when the relationship between the first vehicle and the vehicle satisfies the predetermined offset condition, when a vehicle-to-vehicle distance between the second vehicle and the vehicle is equal to or less than a predetermined distance or when a value obtained by dividing the vehicle-to-vehicle distance between the second vehicle and the vehicle by a relative speed between the second vehicle and the vehicle is equal to or less than a predetermined time.

2. The vehicle control device according to claim 1, wherein the offset unit is configured to set a start prohibition area where the offset processing is not performed even when the relationship between the first vehicle and the vehicle satisfies the predetermined offset condition and a continuation prohibition area that is narrower than the start prohibition area and where the offset processing is not continued even if the relationship between the first vehicle and the vehicle satisfies the predetermined offset condition after the offset processing is started, on a coordinate plane having the vehicle-to-vehicle distance between the second vehicle and the vehicle as a first axis and the relative speed between the second vehicle and the vehicle as a second axis, and determine the start or continuation of the offset processing based on the vehicle-to-vehicle distance between the second vehicle and the vehicle, the relative speed between the second vehicle and the vehicle, the start prohibition area, the continuation prohibition area, and an execution state of the offset processing.

3. The vehicle control device according to claim 1, further comprising a target lateral position setting unit configured to determine whether an operation state of the offset processing is a non-operation state in which the offset processing is not executed, or an operation state in which the offset processing is executed, the determination being based on whether an offset processing start condition or an offset processing continuation condition is satisfied a predetermined number of times in succession in relationship with one of the first or second vehicles.

4. The vehicle control device according to claim 3, wherein the determination is further based on satisfying a plurality of processing conditions including:

a first processing condition including the offset processing continuation condition satisfying a predetermined number of times in succession in the relationship with one of the first or second vehicles, and is not in a continuation prohibition area with the other of the first or second vehicles, the continuation prohibition area being a smaller area than the start prohibition area, and is set within the start prohibition area;

a second processing condition including the offset processing continuation condition satisfying a predetermined number of times in succession in the relationship with the one of the first or second vehicles, and is in the continuation prohibition area with the other of the first or second vehicles; and a third processing condition including the offset processing continuation condition is not satisfied a predetermined number of times in succession in the relationship with the one of the first or second vehicles.

5. A vehicle control device that controls a travel of a vehicle such that a lateral position of the vehicle becomes a target lateral position set in a lane, comprising:

a first vehicle detection unit configured to detect a first vehicle traveling in a first lane among lanes adjacent to both sides of the lane in which the vehicle travels;

a second vehicle detection unit configured to detect a second vehicle traveling in a second lane among the lanes adjacent to both sides of the lane in which the vehicle travels;

a target lateral position setting unit configured to execute change processing for changing the target lateral position in the lane in which the vehicle travels such that the target lateral position is separated from the first lane, when a relationship between the first vehicle and the vehicle satisfies a predetermined first condition; and a controller configured to control the travel of the vehicle according to the target lateral position, wherein the target lateral position setting unit is configured to set the target lateral position to a central position of the lane even if the relationship between the first vehicle and the vehicle satisfies the predetermined first condition, when the relationship between the second vehicle and the vehicle satisfies a predetermined second condition.

6. The vehicle control device according to claim 5, wherein the relationship between the vehicle and the second vehicle includes at least one of a vehicle-to-vehicle distance in a traveling direction between the vehicle and the second vehicle, a lane-width-direction distance between the vehicle and the second vehicle, and a relative speed between the vehicle and the second vehicle.

7. The vehicle control device according to claim 5, wherein the relationship between the second vehicle and the vehicle satisfies the second condition when a vehicle-to-vehicle distance between the second vehicle and the vehicle is equal to or less than a predetermined value.

8. The vehicle control device according to claim 5, wherein the relationship between the second vehicle and the vehicle satisfies the second condition when a value obtained by dividing a vehicle-to-vehicle distance between the second vehicle and the vehicle by a relative speed between the second vehicle and the vehicle is equal to or less than a predetermined time.

9. A vehicle control device that controls a travel of a vehicle such that a lateral position of the vehicle becomes a target lateral position set in a lane, comprising:

a first vehicle detection unit configured to detect a first vehicle traveling in a first lane among lanes adjacent to both sides of the lane in which the vehicle travels;

a second vehicle detection unit configured to detect a second vehicle traveling in a second lane among the lanes adjacent to both sides of the lane in which the vehicle travels;

a target lateral position setting unit configured to execute change processing for changing the target lateral position in the lane in which the vehicle travels such that the target lateral position is separated from the first lane, when a relationship between the first vehicle and the vehicle satisfies a predetermined first condition; and a controller configured to control the travel of the vehicle according to the target lateral position, wherein the target lateral position setting unit is configured to determine whether or not to execute the change processing based on the travel states of the vehicle and the second vehicle, and configured to set the target lateral position to a central position of the lane even if the relationship between the first vehicle and the vehicle satisfies the predetermined first condition.

\* \* \* \* \*